United States Patent
Ochi et al.

(10) Patent No.: US 10,738,198 B2
(45) Date of Patent: Aug. 11, 2020

(54) POWDER COATING MATERIAL, METHOD FOR PRODUCING POWDER COATING MATERIAL, AND COATED ARTICLE

(71) Applicant: AGC Inc., Chiyoda-ku (JP)

(72) Inventors: Shuhei Ochi, Chiyoda-ku (JP); Masataka Aikawa, Chiyoda-ku (JP); Shun Saito, Chiyoda-ku (JP)

(73) Assignee: AGC Inc., Chiyoda-ku (JP)

( * ) Notice: Subject to any disclaimer, the term of this patent is extended or adjusted under 35 U.S.C. 154(b) by 137 days.

(21) Appl. No.: 16/014,430

(22) Filed: Jun. 21, 2018

(65) Prior Publication Data

US 2018/0298199 A1    Oct. 18, 2018

Related U.S. Application Data

(63) Continuation of application No. PCT/JP2016/088210, filed on Dec. 21, 2016.

(30) Foreign Application Priority Data

Dec. 25, 2015 (JP) ................................. 2015-255174

(51) Int. Cl.
| | |
|---|---|
| *C09D 201/04* | (2006.01) |
| *C09D 7/40* | (2018.01) |
| *C09D 5/03* | (2006.01) |
| *C09D 127/12* | (2006.01) |
| *C09D 7/63* | (2018.01) |
| *C09D 7/62* | (2018.01) |
| *C09D 167/00* | (2006.01) |
| *C08K 3/08* | (2006.01) |
| *C08K 9/04* | (2006.01) |
| *C08K 3/013* | (2018.01) |
| *C08K 5/06* | (2006.01) |

(52) U.S. Cl.
CPC .............. *C09D 5/032* (2013.01); *C09D 5/03* (2013.01); *C09D 5/035* (2013.01); *C09D 7/40* (2018.01); *C09D 7/62* (2018.01); *C09D 7/63* (2018.01); *C09D 7/70* (2018.01); *C09D 127/12* (2013.01); *C09D 167/00* (2013.01); *C09D 201/04* (2013.01); *C08K 3/013* (2018.01); *C08K 3/08* (2013.01); *C08K 5/06* (2013.01); *C08K 9/04* (2013.01); *C08K 2003/0812* (2013.01)

(58) Field of Classification Search
None
See application file for complete search history.

(56) References Cited

U.S. PATENT DOCUMENTS

| | | | | | |
|---|---|---|---|---|---|
| 3,449,291 A | * | 6/1969 | Bartsch | .................... | C08J 3/205 524/562 |
| 3,781,239 A | * | 12/1973 | Birchall | .................. | C08K 3/32 524/144 |
| 3,980,491 A | * | 9/1976 | Eberts | ................... | C09C 1/0015 106/418 |
| 4,675,345 A | * | 6/1987 | Pecsok | .................. | C08J 9/0023 521/60 |
| 4,880,867 A | * | 11/1989 | Gobel | .................. | C09D 133/14 524/507 |
| 5,827,608 A | * | 10/1998 | Rinehart | ................. | B01D 1/18 428/332 |
| 6,403,670 B1 | * | 6/2002 | Ishidoya | ............ | C08G 18/8077 522/6 |
| 2002/0007769 A1 | * | 1/2002 | Yoshioka | ................. | C09D 5/36 106/403 |
| 2003/0150359 A1 | | 8/2003 | Lassmann | | |
| 2006/0062908 A1 | * | 3/2006 | Ohkoshi | ............... | B05D 7/536 427/180 |
| 2006/0063004 A1 | * | 3/2006 | Takano | .................. | B82Y 30/00 428/407 |
| 2008/0269403 A1 | * | 10/2008 | Kruithof | ............... | C09D 5/035 524/556 |
| 2015/0072151 A1 | * | 3/2015 | Saito | ....................... | C23C 26/00 428/421 |
| 2016/0096975 A1 | | 4/2016 | Saito et al. | | |
| 2016/0160054 A1 | | 6/2016 | Saito et al. | | |
| 2016/0347704 A1 | * | 12/2016 | Kropf | ...................... | A61K 8/37 |

FOREIGN PATENT DOCUMENTS

| | | |
|---|---|---|
| EP | 3266840 A1 | 1/2018 |
| JP | 2003-535187 | 11/2003 |
| JP | 2004-107487 | 4/2004 |
| JP | 2012-136640 | 7/2012 |
| JP | 2013-159621 | 8/2013 |
| JP | 5372621 B2 | 12/2013 |
| JP | 5419828 B2 | 2/2014 |
| JP | 2014-218671 | 11/2014 |
| WO | WO 2005/007755 A1 | 1/2005 |

(Continued)

OTHER PUBLICATIONS

International Search Report dated Feb. 28, 2017 in PCT/JP2016/088210 filed Dec. 21, 2016 (with English Translation).

(Continued)

*Primary Examiner* — Peter A Salamon

(74) *Attorney, Agent, or Firm* — Oblon, McClelland, Maier & Neustadt, L.L.P.

(57) ABSTRACT

To provide a powder coating material excellent in blocking resistance and capable of forming a coating film excellent in color tone and weather resistance in which the occurrence of color unevenness is suppressed, a method for its production, and a coated article having a coating film formed from the powder coating material. The powder coating material comprises a resin powder, a luster pigment and a binder, wherein the resin powder contains a fluororesin and a non-fluororesin, the binder contains a surfactant having a melting point of at least 25° C., and the luster pigment is bonded to the particle surfaces of the resin powder via the binder.

12 Claims, No Drawings

(56) References Cited

FOREIGN PATENT DOCUMENTS

| WO | WO 2012/048650 A1 | 4/2012 | | |
|---|---|---|---|---|
| WO | WO 2013/186832 A1 | 12/2013 | | |
| WO | WO-2013186832 A1 | * 12/2013 | ........... | C09D 167/00 |
| WO | WO 2014/002964 A1 | 1/2014 | | |
| WO | WO 2015/016185 A1 | 2/2015 | | |
| WO | WO 2015/046262 A1 | 4/2015 | | |

OTHER PUBLICATIONS

U.S. Appl. No. 15/653,656, filed Jul. 19, 2017, 2017/0321065 A1, Shuhei Ochi, et al.

U.S. Appl. No. 15/670,673, filed Aug. 7, 2017, 2017/0335117 A1, Shuhei Ochi, et al.

* cited by examiner

POWDER COATING MATERIAL, METHOD FOR PRODUCING POWDER COATING MATERIAL, AND COATED ARTICLE

TECHNICAL FIELD

The present invention relates to a powder coating material, a method for producing a powder coating material, and a coated article.

BACKGROUND ART

In recent years, from the viewpoint of environmental measures, discharge of volatile organic compounds (VOC) such as organic solvents into the atmosphere has been regarded as a problem, and de-VOC movement is required.

Also in the paint industry, in addition to the conventional coating material containing an organic solvent, from the viewpoint of de-VOC movement, a powder coating material has been widely used. A powder coating material is substantially free from an organic solvent and thus requires no exhaust treatment or no waste liquid treatment during its use, and it is possible to recover and reuse it, whereby its environmental impact is extremely low.

As properties required for powder coating materials, in color variations of coating materials, a level comparable to conventional coating materials is required in recent years. Among them, a demand for metallic color (luster color) is high, and a demand for a metallic color with a plating tone is growing particularly in the field of building material products.

As such a powder coating material, Patent Document 1 discloses a powder coating material comprising a fluororesin as a resin powder and a hydrogenated terpene resin as a binder.

PRIOR ART DOCUMENT

Patent Document

Patent Document 1: JP-A-2012-136640

DISCLOSURE OF INVENTION

Technical Problem

However, in the powder coating material comprising a fluororesin as a resin powder and a hydrogenated terpene resin as a binder as disclosed in Patent Document 1, if a luster pigment having a metallic color is blended, there has been a case where the bonding force (adhesive strength) between the resin powder and the luster pigment becomes too strong, whereby the fluidity of the luster pigment during coating decreases, and the orientation of the luster pigment is reduced. As a result, the color tone and weather resistance of the obtainable coating film has tended to be insufficient.

Further, in the particles constituting the resin powder, if adhesive properties of luster pigment are different among the particles, the obtainable coating film has tended to have color unevenness.

Furthermore, when the powder coating material has been stored, there has been a tendency that the coating material component is agglomerated to become blocky (so-called, reduction of blocking resistance), thus leading to a failure in coating.

The present invention has been made in view of the above problem and has an object to provide a powder coating material excellent in blocking resistance and capable of forming a coating film excellent in the color tone and weather resistance, in which occurrence of color unevenness is suppressed, and a method for its production. Further, the present invention has another object to provide a coated article having such a coating film.

Solution to Problem

The present inventors have intensively studied the above problem and as a result have found it possible to obtain desired effects by using a surfactant having a specific melting point as a binder, thus arriving at the present invention.

That is, the present inventors have found that the above problem can be solved by the following constructions.

[1] A powder coating material comprising a resin powder, a luster pigment and a binder, wherein the resin powder contains a fluororesin and a non-fluororesin, the binder contains a surfactant having a melting point of at least 25° C., and the luster pigment is bonded to the particle surface of the resin powder via the binder.

[2] The powder coating material according to [1], wherein the resin powder is composed of particles of a mixed resin containing the fluororesin and the non-fluororesin.

[3] The powder coating material according to [1] or [2], wherein the surfactant is a nonionic surfactant.

[4] The powder coating material according to [3], wherein the nonionic surfactant is an ether type surfactant.

[5] The powder coating material according to any one of [1] to [4], wherein the melting point of the surfactant is at least 40° C.

[6] The powder coating material according to any one of [1] to [5], wherein the mass ratio of the content of the fluororesin to the content of the non-fluororesin is from 0.25 to 4.

[7] The powder coating material according to any one of [1] to [6], wherein the value obtained by subtracting the SP value of the fluororesin from the SP value of the non-fluororesin is at least 0.4 $(J/cm^3)^{1/2}$.

[8] The powder coating material according to any one of [1] to [7], wherein the luster pigment consists of luster pigment particles covered by a covering material, and the SP value of the covering material is larger than the SP value of the fluororesin and smaller than the SP value of the non-fluororesin.

[9] The powder coating material according to any one of [1] to [8], wherein the content (solid content) of the luster pigment is from 0.7 to 23 mass % to the total mass (solid content) of the powder coating material.

[10] A coated article comprising a substrate and a coating film formed on the substrate by the powder coating material as defined in any one of [1] to [9].

[11] A method for producing a powder coating material, which comprises mixing a resin powder containing a fluororesin and a non-fluororesin and a luster pigment to obtain a mixture, then mixing the mixture and a binder containing a surfactant having a melting point of at least 25° C., to let the luster pigment be bonded to the particle surface of the resin powder via the binder.

[12] The method for producing a powder coating material according to [11], wherein as the binder, a binder solution containing a solvent is used, and after mixing the binder solution and the mixture, the solvent is removed to let the luster pigment particles be bonded to the particle surface of the resin powder.

Advantageous Effects of Invention

As shown below, according to the present invention, it is possible to provide a powder coating material excellent in blocking resistance and capable of forming a coating film excellent in color tone and weather resistance, wherein occurrence of color unevenness is suppressed, and a method for its production. Further, according to the present invention, it is possible to provide a coated article having such a coating film.

DESCRIPTION OF EMBODIMENTS

Meanings of the terms in the present invention are as follows.

A "unit" contained in a resin is a general term for an atomic group which is directly formed by polymerization of a monomer and an atomic group obtained by chemically converting a part of the atomic group which is directly formed by polymerization of a monomer.

A "(meth)acrylate" is a general term for an acrylate and a methacrylate.

An "acrylic resin" means a polymer whose main units are units based on a (meth) acrylate.

The "number average molecular weight" and "weight average molecular weight" of a resin are values obtained as calculated as polystyrene by a gel permeation chromatography (GPC) method. Here, the number average molecular weight may be referred to also as "Mn", and the weight average molecular weight may be referred to also as "Mw".

The "glass transition temperature" of a resin means the midpoint glass transition temperature measured by a differential scanning calorimetry (DSC) method. Here, the glass transition temperature may also be referred to simply as "Tg".

Measurement of the hydroxy value of a resin is conducted in accordance with JIS K1557-1: 2007 (ISO 14900: 2001).

The "fluorine content" in a fluororesin is meant for the proportion (mass %) of fluorine atoms to all atoms constituting the fluororesin. The fluorine content in a fluororesin is obtainable by analyzing the fluororesin by a nuclear magnetic resonance spectroscopy, but it can be estimated also from the charged amounts of components to be used in the production of the fluororesin.

The "SP value" (solubility parameter) is the cohesive energy density of a compound, i.e. the square root value of the evaporation energy per unit volume of one molecule, and is an index for showing the magnitude of the polarity per unit volume. In the case of a mixture of two compounds, when the difference between the respective SP values is small, compatibility of the two compounds is high, and when the difference between the respective SP values is large, compatibility of the two compounds is low.

The SP value is calculated by the Fedros Method: (literature: see R. F. Fedros, Polym. Eng. Sci., 14[2] 147 (1974)). Specifically, the SP value is a value calculated by the following formula.

$$\text{SP value} = (\Delta H/V)^{1/2}$$

In the formula, $\Delta H$ is the molar heat of vaporization (cal), and V is the molar volume (cm$^3$). Here, as $\Delta H$ and V, the sum ($\Delta H$) of the molar heats of vaporization and the sum (V) of the molar volumes, of atomic groups disclosed in the above literature, are used.

The "melting point" of a resin or a surfactant means the temperature at the melting peak as measured by a differential scanning calorimetry (DSC) method.

The "average particle size" of a resin powder or a luster pigment is obtained by calculating the volume-average from the particle size distribution measured by using a known particle size distribution measuring device based on a laser diffraction method as a measurement principle (e.g. manufactured by Sympatec, tradename "Helos-Rodos").

The "dry blend" means that two or more powders (powder materials) are blended without melting the powders (powder materials) and without adding a solvent.

A "molten film" of a powder coating material means a film made from a melt of the powder coating material.

A "coating film" formed from a powder coating material means a film formed by cooling a molten film of the powder coating material, or in some cases, by curing it.

The term "one coating" means coating only once.

The powder coating material of the present invention is a powder coating material comprising a resin powder, a luster pigment and a binder, wherein the resin powder contains a fluororesin and a non-fluororesin, the binder contains a surfactant having a melting point of at least 25° C., and the luster pigment is bonded to the particle surface of the resin powder via the binder.

The powder coating material of the present invention is a powdery coating material. It may be said that the powder coating material of the present invention is a collection of particles formed by bonding the luster pigment to the particle surface constituting the resin powder via the binder.

The powder coating material of the present invention is, since a surfactant having a predetermined melting point is used as the binder, capable of forming a coating film excellent in color tone and weather resistance, wherein occurrence of color unevenness is suppressed, and excellent also in blocking resistance. Details of the reason for this are considered to be as follows.

As the method for producing a powder coating material having a pigment bonded to the surface of a resin powder, a bonded method wherein a resin powder and a pigment are bonded by a binder, or a dry blending method wherein a pigment and a resin powder are bonded without using a solvent, may be mentioned.

In the case of using a powder coating material obtained by the dry blending method, it is necessary to electrify the resin powder and the luster pigment at the time of electrostatic coating. However, since the electrification rates of the resin powder and the luster pigment are different, it becomes difficult to control the coating deposition rates of the resin powder and the pigment, whereby the obtainable coating film is likely to have color unevenness.

On the other hand, according to the bonded method, since the resin powder and the pigment are well bonded via a binder, the change of the coating deposition rates as described above is less likely to occur, and it is possible to obtain a coating film having color unevenness suppressed.

However, if the bonding (adhesion) between the resin powder and the luster pigment by the binder is too strong, fluidity of the luster pigment at the time of coating tends to be insufficient, thus leading to a new problem that orientation of the luster pigment tends to be low. In such a case, the color tone and weather resistance of the obtainable coating film tend to be lowered. Specifically, in the case of using a polymer compound having a high adhesive strength such as a terpene resin, as the binder, the above-mentioned problem is likely to occur.

Against this problem, in the present invention, a surfactant having a specific melting point is used as a binder. Thus, while weakening the bonding strength between the resin powder and the pigment to some extent, it is possible to maintain the bonding of the two components sufficiently. It is considered that as a result, in the coating film formed from the powder coating material of the present invention (hereinafter referred to also as "the present coating film"), it is possible to improve the color tone and weather resistance, while suppressing occurrence of color unevenness.

Further, it is considered that since the melting point of the surfactant used as the binder is at least a normal temperature (20 to 25° C.), the surfactant tends to be hardly liquefied during the storage of the powder coating material, whereby it is possible to suppress the aggregation of particles contained in the coating material one another. As a result, occurrence of blocking is considered to have been suppressed.

The resin powder in the present invention contains a fluororesin and a non-fluororesin. The resin powder is composed of a collection of resin particles having a particulate form. The resin powder may be a powder made from fluororesin particles and non-fluororesin particles, or it may be a powder made from particles of a mixed resin comprising the fluororesin and the non-fluororesin. As such resin particles, two or more types may be used in combination.

From such a viewpoint that smoothness of the outer appearance of the present coating film will be good, the resin powder is preferably a powder comprising particles of a mixed resin containing the fluororesin and the non-fluororesin.

In the resin powder, since the strength of the present coating film will be more excellent, at least one of the fluororesin and the non-fluororesin is preferably a thermosetting resin.

In the resin powder, the mass ratio of the content of the fluororesin to the content of the non-fluororesin (content of the fluororesin/content of the non-fluororesin) is preferably from 0.25 to 4, more preferably from 0.3 to 3.5, further preferably from 0.35 to 3.

When the mass ratio is at least 0.25, the present coating film will be more excellent in weather resistance. When the mass ratio is at most 4, the hydrochloric acid resistance, nitric acid resistance, shielding properties and weather resistance will be more excellent.

The content (solid content) of the resin powder is preferably from 20 to 99 mass %, more preferably from 30 to 97 mass %, to the total mass (solid content) of the powder coating material. When the content of the resin powder is within the above range, the present coating film will be more excellent in non-occurrence of color unevenness, the core tone and the shielding properties. Here, "solid content" is meant for a component which does not contain a solvent, etc. and which is capable of constituting a powder coating material (raw material for a powder coating material).

The average particle size of the resin powder is preferably from 5 to 100 μm. The lower limit value is more preferably 15 μm. Further, the upper limit is more preferably 60 μm, particularly preferably at most 50 μm.

When the average particle size is at least 5 μm, cohesion will be lowered while being homogeneously mixed with a luster pigment, whereby it will be uniformly easily dusted at the time of powder coating. Further, when it is at most 100 μm, the present coating film will be excellent in surface smoothness and outer appearance.

The fluororesin may be a homopolymer or copolymer of a fluoroolefin. As the copolymer, a copolymer of a fluoroolefin with a fluorinated monomer other than a fluoroolefin or a monomer having no fluorine atom, may be mentioned.

The fluoroolefin is preferably $CF_2=CF_2$, $CF_2=CFCl$, $CF_2=CFCF_3$, $CH_2=CF_2$, $CH_2=CHF$ or $CF_2=CHCF_3$, particularly preferably $CF_2=CF_2$ or $CF_2=CFCl$. When the fluoroolefin has chlorine atom(s), it will be easy to control Tg of the fluororesin to be at least 50° C., and it will be possible to suppress blocking of the present coating film (such a phenomenon that the coating film may stick to other layers and become to be hardly peeled). Further, another pigment (particularly a colored organic pigment such as cyanine blue or cyanine green), etc. to be blended as the case requires to the fluororesin, tend to be easily uniformly dispersed.

As the fluoroolefin, one type may be used alone, or two or more types may be used in combination.

As the fluorinated monomer other than a fluoroolefin, a fluoro(alkyl vinyl ether), a perfluoro(alkyl vinyl ether), etc. may be mentioned. The fluorinated monomer may have a reactive group.

As the monomer having no fluorine atom (hereinafter referred to also as "another monomer"), a monomer having a reactive group (hereinafter referred to also as "another monomer 1") or another monomer having no reactive group (hereinafter referred to as "another monomer 2") may be mentioned.

The reactive group is preferably a hydroxy group, a carboxy group or an amino group, and in a case where the powder coating material contains an isocyanate-type curing agent (especially a blocked isocyanate-type curing agent) to be described later, a hydroxy group or a carboxy group is preferred from the viewpoint of the curing speed.

Among another monomer 1, a specific monomer having a hydroxy group may be allyl alcohol, a hydroxyalkyl vinyl ether (2-hydroxyethyl vinyl ether, 4-hydroxybutyl vinyl ether, cyclohexanediol monovinyl ether, etc.), a hydroxyalkyl allyl ether (2-hydroxyethyl allyl ether, etc.), a hydroxy alkanoic acid vinyl (hydroxypropionic acid vinyl, etc.) or a hydroxyalkyl (meth)acrylate (hydroxyethyl (meth)acrylate, etc.).

Among another monomer 1, a specific monomer having a carboxy group may be acrylic acid, methacrylic acid, a carboxyalkyl vinyl ether or carboxy allyl ether.

Further, in the case of introducing a carboxy group into a fluororesin, a fluororesin having a carboxy group may be prepared by reacting a fluororesin containing units based on a monomer having a hydroxy group, with an acid anhydride.

Specific examples of the acid anhydride include succinic anhydride, glutaric anhydride, itaconic anhydride, 1,2-cyclohexanedicarboxylic acid anhydride, cis-4-cyclohexene-1,2-dicarboxylic acid anhydride, phthalic acid anhydride, 4-methylhexahydrophthalic anhydride, 1,8-naphthalic anhydride, maleic anhydride, etc.

Specific examples of another monomer 2 include an olefin, a vinyl ether, a vinyl ester, etc.

Specific examples of the olefin include ethylene, propylene, isobutylene, etc.

Specific examples of the vinyl ether include a cycloalkyl vinyl ether (cyclohexyl vinyl ether, etc.), and an alkyl vinyl ether (nonyl vinyl ether, 2-ethylhexyl vinyl ether, hexyl vinyl ether, ethyl vinyl ether, n-butyl vinyl ether, tert-butyl vinyl ether, etc.).

Specific examples of the vinyl ester include vinyl acetate, vinyl chloroacetate, vinyl butanoate, vinyl pivalate, vinyl benzoate, and vinyl crotonate.

Another monomer 2 is, from the viewpoint of suppressing blocking of the present coating film by controlling Tg of the fluororesin to be at least 50° C., preferably a cycloalkyl vinyl ether or vinyl ester, particularly preferably a cycloalkyl vinyl ether or vinyl pivalate.

The content of units based on a fluoroolefin in the fluororesin is preferably from 10 to 90 mol %, more preferably from 30 to 70 mol %, particularly preferably from 40 to 60 mol %, to all units. When the content of the units is within such a range, the present coating film will be more excellent in weather resistance, adhesion and smoothness.

The content of units based on another monomer 1 in the fluororesin is preferably from 0.5 to 20 mol %, particularly preferably from 1 to 15 mol %, to all units. When the content of the units is within such a range, adhesion between the layer derived from the fluororesin layer and the layer derived from the non-fluororesin in the present coating film (hereinafter referred to also as "interlayer adhesion") will be better, and the present coating film will be more excellent in scratch resistance.

The content of units based on another monomer 2 in the fluororesin is preferably from 9.5 to 70 mol %, more preferably from 20 to 60 mol %, particularly preferably from 30 to 50 mol %, to all units. When the content of the units is within such a range, it will be easy to control Tg of the fluororesin to be in a proper range, and it will be easy to produce a resin powder. Further, the interlayer adhesion will be more excellent, and the present coating film will be more excellent in scratch resistance.

Mn of the fluororesin is preferably from 3,000 to 50,000, more preferably from 5,000 to 30,000, particularly preferably from 10,000 to 30,000. When Mn of the fluororesin is within such a range, the present coating film will be more excellent in water resistance, salt water resistance and surface smoothness.

The hydroxy value of the fluororesin is preferably from 5 to 100 mgKOH/g, particularly preferably from 10 to 80 mgKOH/g. When the hydroxy value of the fluororesin is within such a range, interlayer adhesion will be excellent, and the present coating film will be more excellent in cracking resistance under a temperature cycle between a high temperature (at least 100° C.) and a low temperature (at most 10° C.).

The melting point of the fluororesin is preferably at most 300° C., more preferably at most 200° C., particularly preferably at most 180° C. When the melting point of the fluororesin is within such a range, the present coating film will be more excellent in surface smoothness. The melting point of the fluororesin is preferably at least 60° C., particularly preferably at least 70° C., further preferably at least 80° C.

Tg of the fluororesin is preferably from 40 to 150° C., more preferably from 45 to 120° C., particularly preferably from 50 to 100° C. When Tg of the fluororesin is within such a range, it will be easy to produce a resin powder, and the present coating film will be more excellent in surface smoothness.

The fluorine content in the fluororesin is preferably at least 10 mass %, more preferably at least 15 mass %, further preferably at least 20 mass %, particularly preferably at least 25 mass %. Further, the fluorine content is preferably at most 80 mass %, more preferably at most 70 mass %. When the fluorine content of the fluororesin is within such a range, the present coating film will be more excellent in weather resistance and skin smoothness.

As the fluororesin, a commercially available product may also be used so long as it is useful as a powder coating material. Such a commercially available product may, for example, be Lumiflon 710, 710F (tradename, manufactured by Asahi Glass Co., Ltd.), ZEFFLE (tradename, manufactured by Daikin Industries, Ltd.), Kynar (tradename, manufactured by Arkema), ZB-F1000 (tradename manufactured by Dalian Zebon Co., Ltd.), Etafuron (tradename, manufactured by Eternal Corp.), DS203 (tradename, manufactured by Dongyue Shenzhou Corp.), etc.

The SP value of the fluororesin (hereinafter referred to also as "$SP_{a1}$") is preferably from 16.0 to 20.0 $(J/cm^3)^{1/2}$, more preferably from 16.5 to 19.5 $(J/cm^3)^{1/2}$, particularly preferably from 17.0 to 19.0 $(J/cm^3)^{1/2}$.

The non-fluororesin in the present invention is preferably a polyester resin, an acrylic resin, an epoxy resin or an urethane resin. From such a viewpoint that layer separation from the fluororesin is easy in the melting and curing process of the powder coating material, a polyester resin, an acrylic resin or an epoxy resin is more preferred, and from such a viewpoint that adhesion to a substrate is excellent, and the fluororesin is less likely to be mixed into its layer, a polyester resin or an acrylic resin is particularly preferred, and a polyester resin is most preferred.

As the non-fluororesin, one type may be used alone, or two or more types may be used in combination.

In a case where the fluororesin is polyvinylidene fluoride, from the viewpoint of excellent interlayer adhesion in the present coating film, the non-fluororesin preferably contains an acrylic resin.

The polyester resin is a polymer having polybasic carboxylic acid units and polyhydric alcohol units, and the polybasic carboxylic acid units and the polyhydric alcohol units are connected by ester bonds. The polyester resins may, as the case requires, have units other than these two types of units (for example, units derived from a hydroxycarboxylic acid (provided that units derived from a polybasic carboxylic acid are excluded)). The polyester resin has at least one of a carboxy group and a hydroxy group at a terminal of the polymer chain.

The polybasic carboxylic acid is preferably phthalic acid, isophthalic acid, terephthalic acid, naphthalene dicarboxylic acid, trimellitic acid, pyromellitic acid, phthalic anhydride or the like, and from such a viewpoint that the coating film will be more excellent in weather resistance, isophthalic acid is preferred.

As the polyhydric alcohol, from such a viewpoint that the present coating film will be excellent in adhesion to the substrate and flexibility, an aliphatic polyhydric alcohol or an alicyclic polyhydric alcohol is preferred, and an aliphatic polyhydric alcohol is more preferred.

Specific examples of the polyhydric alcohol include ethylene glycol, diethylene glycol, triethylene glycol, 1,2-propanediol, 1,3-propanediol, 1,3-butanediol, 1,4-butanediol, 1,2-pentanediol, 1,5-pentanediol, neopentyl glycol, spiro glycol, 1,10-decanediol, 1,4-cyclohexanedimethanol, trimethylolethane, trimethylolpropane, glycerol, pentaerythritol, etc.

The polyhydric alcohol is preferably neopentyl glycol, 1,2-pentanediol, 1,5-pentanediol or trimethylolpropane, particularly preferably neopentyl glycol or trimethylolpropane.

Mn of the polyester resin is preferably at most 5,000 from such a viewpoint that it is thereby possible to make the melt viscosity of the coating film to be properly low. Mn of the polyester resin is, from the viewpoint of suppressing the melt viscosity of the coating film, preferably from 2,000 to 20,000, particularly preferably from 2,000 to 10,000.

The polyester resin is preferably a polyester resin having Mn of at most 5,000 and Mw of from 2,000 to 20,000, particularly preferably a polyester resin having Mn of at most 5,000 and Mw of from 2,000 to 10,000.

Specific examples of the polyester resin include "CRYLCOAT (registered trademark) 4642-3", "CRYLCOAT (registered trademark) 4890-0", manufactured by Daicel-Allnex Ltd., "U-PICA COAT (registered trademark) GV-250", "U-PICA COAT (registered trademark) GV-740", "U-PICA COAT (registered trademark) GV-175", manufactured by Japan U-pica Company Ltd., "Uralac (registered trademark) 1680" manufactured by DSM Co., Ltd., etc.

The acrylic resin is preferably an acrylic resin having carboxy groups, hydroxy groups or sulfo groups. In a case where the acrylic resin contains other pigments that will be described later, it can improve the dispersibility of such other pigments.

Tg of the acrylic resin is preferably from 30 to 60° C. When Tg of the acrylic resin is within such a range, the present coating film is less susceptible to blocking, and the surface smoothness of the present coating film will be more excellent.

Mn of the acrylic resin is preferably from 5,000 to 100,000, particularly preferably from 30,000 to 100,000. When Mn of the acrylic resin is within such a range, the present coating film is less susceptible to blocking, and the surface smoothness of the present coating film will be more excellent.

Mw of the acrylic resin is preferably from 6,000 to 150,000, more preferably from 10,000 to 150,000, particularly preferably from 15,000 to 150,000. When Mw of the acrylic resin is within such a range, the present coating film is less susceptible to blocking, and the surface smoothness of the present coating film will be more excellent.

In a case where the acrylic resin has carboxy groups, the acid value of the acrylic resin is preferably from 150 to 400 mgKOH/g. When the acid value of the acrylic resin is within such a range, the dispersibility of other pigments that will be described later, will be improved, and the moisture resistance of the present coating film will be more excellent.

Specific examples of the acrylic resin include "FINEDIC (registered trademark) A-249", "FINEDIC (registered trademark) A-251", "FINEDIC (registered trademark) A-266", manufactured by DIC Corporation, "ALMATEX (registered trademark) PD6200", "ALMATEX (registered trademark) PD7310", manufactured by Mitsui Chemicals, Inc., "SANPEX PA-55", manufactured by Sanyo Chemical Industries, Ltd., etc.

The epoxy resin is a compound (prepolymer) having two or more epoxy groups in the molecule. The epoxy resins may further have other reactive groups other than epoxy groups.

Specific examples of the epoxy resin may be a bisphenol A type epoxy resin, a bisphenol F type epoxy resin, etc., and commercial products include "EPICOAT (registered trademark) 1001", "EPICOAT (registered trademark) 1002", "EPICOAT (registered trademark) 4004P", manufactured by Mitsubishi Chemical Corporation, "EPICLON (registered trademark) 1050", "EPICLON (registered trademark) 3050", manufactured by DIC Corp., "EPOTOHTO (registered trademark) YD-012", "EPOTOHTO (registered trademark) YD-014", manufactured by Nippon Steel & Sumikin Chemical Co., Ltd., "DENACOL (registered trademark) EX-711", manufactured by Nagase Chemtex Corp., "EHPE3150", manufactured by Daicel Corp., etc.

The urethane resin may be a urethane resin obtained by reacting a polyol (acrylic polyol, polyether polyol, propylene glycol, propylene oxide, etc.) and an isocyanate compound. Here, it is preferred to use a powder of a polyol (acrylic polyol, polyether polyol, etc.) and a powder of an isocyanate compound.

The SP value of the non-fluororesin (hereinafter referred to also as "$SP_{a2}$") is preferably from 18.0 to 30.0 $(J/cm^3)^{1/2}$, more preferably from 18.5 to 29.5 $(J/cm^3)^{1/2}$, particularly preferably from 19.0 to 29.0 $(J/cm^3)^{1/2}$.

In the present coating film, from such a viewpoint that it becomes easy to obtain a coating film having such a layered structure that a layer of a fluororesin and a layer of a non-fluororesin are laminated in this order, the value obtained by subtracting $SP_{a1}$ from $SP_{a2}$ (hereinafter referred to also as "$\Delta SP$") is preferably more than zero $(J/cm^3)^{1/2}$, more preferably at least 0.4 $(J/cm^3)^{1/2}$, particularly preferably from 0.4 to 16 $(J/cm^3)^{1/2}$, further preferably from 1.0 to 14 $(J/cm^3)^{1/2}$, most preferably from 2.0 to 12 $(J/cm^3)^{1/2}$.

When $\Delta SP$ exceeds 0, at the time of forming a molten film made of a melt of a powder coating material by applying the powder coating material to a substrate, a molten fluororesin and a molten non-fluororesin tend to easily undergo layer separation. At that time, it becomes easy that a layer of the non-fluororesin is disposed on the substrate side, and a layer of the fluororesin is disposed on the air side. Therefore, in one coating, it becomes easy to obtain a coating film having such a structure that a layer of the non-fluororesin and a layer of the fluororesin are laminated in this order from the substrate side. Further, when $\Delta SP$ is within the above range, interlayer adhesion will be excellent.

In a case where the fluororesin comprises two or more types of fluororesins, $\Delta SP$ is obtained in such a manner that among the SP values of two or more types of fluororesins, the largest SP value is obtained as $SP_{a1}$.

Further, in a case where the non-fluororesin comprises two or more types if non-fluororesins, $\Delta SP$ is obtained as a difference between $SP_{a2}$ of each of two or more resins and $SP_{a1}$, and each $\Delta SP$ preferably satisfies the above range.

The resin powder may be produced by the following method.

First, a fluororesin and a non-fluororesin are dry-blended by using a mixer, a blender or the like, and then melt-kneaded at from 80 to 120° C. by using a kneader or the like to obtain a kneaded product. At the time of dry blending, if necessary, a curing agent, a curing catalyst, a plasticizer and other additives may be added.

Then, a solidified product obtainable by cooling the kneaded product is pulverized by using a pulverizer to a desired particle size. Subsequently, the pulverized product of the solidified product is classified by using an airflow classifier, to obtain a resin powder.

The resin powder obtainable by the above method is a powder constituted by particles of a mixed resin having the fluororesin and the non-fluororesin mixed (kneaded).

Here, in order to obtain a resin powder comprising resin particles made of a fluororesin and resin particles made of a non-fluororesin, the above method may be conducted independently for each resin alone, and the respectively obtained particles may be mixed. Further, the resin powder may be produced by a spray drying method or a polymerization method other than the above method.

The luster pigment in the present invention is a pigment which imparts a luster to the present coating film, and is preferably a pigment made of metal powder, mica powder, graphite powder, glass flakes or iron oxide powder, and from such a viewpoint that it is possible to form a coating film excellent in luster, and the handling efficiency will be excellent, a pigment made of metal powder is particularly preferred.

The metal powder is preferably made of a metal such as aluminum, zinc, copper, bronze, nickel, titanium, stainless steel, etc., or an alloy thereof. As the metal powder, one type may be used alone, or two or more types may be used in combination. Here, a pigment containing a metal powder may be referred to also as a metallic pigment.

The shape of the luster pigment particles is preferably scaly (flaky).

When the luster pigment particles are scaly, the average aspect ratio is preferably from 10 to 300, more preferably from 50 to 200.

The "aspect ratio" means the ratio of the maximum length to the thickness (maximum length/thickness) of a particle, and the "average aspect ratio" is an average value of the aspect ratios of 50 particles which are randomly selected. The thickness of a luster pigment particle is measured by an atomic force microscope (hereinafter referred to also as "AFM"), and the maximum length of a luster pigment particle is measured by a transmission electron microscope (hereinafter referred to also as "TEM").

As the luster pigment particles, a scaly aluminum powder is preferred, from such a viewpoint that it is excellent in metallic luster and is easy to handle since the specific gravity is small.

As luster pigments, commercially available products may be used, and specifically, aluminum powders available under tradenames "PCU1000", "PCU2000", "PCA9155", "PCR901", (manufactured by ECKART Co., Ltd.), "PCF7620A", "PCF7601A", "PCF7130A", "0100M", "7620NS" (manufactured by Toyo Aluminium K.K.), etc. may be used.

Luster pigment particles are preferably such that at least part of their surface is covered with a covering material. In such a case, on the surface of the particles, a covering layer made from the covering material is present, and the coating layer may be a single layer or a multilayer.

As the covering material, a grinding aid, an inorganic surface treatment agent such as silica, a covering resin or the like may be mentioned.

The grinding aid is an agent that may be used at the time of grinding in the production of the luster pigment, and it may specifically be a fatty acid (oleic acid, stearic acid), an aliphatic amine, an aliphatic amide, an aliphatic alcohol, an ester, etc. The grinding aid has an effect to suppress unnecessary oxidation of the luster pigment particle surface and to improve the gloss. In the present invention, a state where a grinding aid is adsorbed to the surface of luster pigment particles, is also included in the concept of covering.

Further, the adsorption amount of the grinding aid to 100 parts by mass of the luster pigment particles is, from the viewpoint of the glossiness of the present coating film, preferably less than 2 parts by mass.

A specific covering resin may be a phosphoric acid group-containing resin, an acrylic resin, a silicone resin or the like. The amount of the covering resin is preferably at least 2 parts by mass, more preferably at least 5 parts by mass, to 100 parts by mass of luster pigment particles. The upper limit value for the amount is preferably 50 parts by mass.

When the amount is within the above range, the bonding of the resin particles and the luster pigment particles will be better, and the present coating film will be more excellent in weather resistance and chemical resistance.

In a case where the luster pigment is a luster pigment covered with a covering material, the SP value of the covering material (hereinafter referred to also as "$SP_b$") is preferably larger than $SP_{a1}$ and smaller than $SP_{a2}$. By using a luster pigment covered with a covering material having such a SP value, it becomes easy that the luster pigment is localized at the interface between the layer of the non-fluororesin and the layer of the fluororesin which are separated in 2 layers, and disposed to be in substantially parallel to the substrate. Thus, orientation of the luster pigment in the present coating film will be thereby good, and the present coating film will be improved in non-occurrence of color unevenness, color tone and shielding properties. Further, the weather resistance of the present coating film will also be improved. Moreover, in a case where $SP_b$ satisfies the above relation, and the value obtained by subtracting $SP_{a1}$ from $SP_{a2}$ is at least 0.4 $(J/cm^3)^{1/2}$, the weather resistance of the present coating film will be particularly excellent.

$SP_b$ is preferably from 16.0 to 28.0 $(J/cm^3)^{1/2}$, more preferably from 17.0 to 27.0 $(J/cm^3)^{1/2}$, particularly preferably from 18 to 26.0 $(J/cm^3)^{1/2}$.

The content (solid content) of the luster pigment is, to the total mass (solid content) of the powder coating material, preferably from 0.7 to 23 mass %, more preferably from 1.0 to 20 mass %, particularly preferably from 2.0 to 15 mass %. When the content of the luster pigment is within such a range, orientation of the luster pigment in the present coating film will be good, and the present coating film will be more excellent in non-occurrence of color unevenness, color tone and shielding properties.

The binder in the present invention contains a surfactant having a melting point of at least 25° C.

The melting point of the surfactant is preferably at least 30° C., more preferably at least 40° C., further preferably at least 50° C. The upper limit of the melting point is preferably 150° C., more preferably 140° C., particularly preferably 120° C.

When the melting point of the surfactant is within such a range, the surfactant tends to be uniformly penetrated and dispersed in the resin powder, and the blocking resistance of the powder coating material will be more excellent.

The surfactant is preferably a cationic surfactant, an anionic surfactant, an amphoteric surfactant or a nonionic surfactant, and a nonionic surfactant is particularly preferred.

When the surfactant is a nonionic surfactant, the shielding properties of a coating film formed after the powder coating material is stored for a long period of time, will be excellent. The reason is not necessarily clear, but it is considered that by the action of the nonionic surfactant, bonding of the luster pigment and the resin powder is well maintained for a long period of time.

As the cationic surfactant, an amine salt, a quaternary ammonium salt, etc. may be mentioned.

As the anionic surfactant, an aromatic sulfonate, a higher alcohol sulfuric ester salt, a polyoxyethylene alkyl ether sulfate, an α-sulfo fatty acid ester salt, an α-olefin sulfonate, a monoalkyl phosphoric ester salt, an alkane sulfonic acid salt, etc. may be mentioned.

As the amphoteric surfactant, an alkyl betaine, an alkyl amino fatty acid salt, an alkyl amine oxide, etc. may be mentioned.

As the nonionic surfactant, a sugar ester-type surfactant such as a sorbitan fatty acid ester, a polyoxyethylene sorbitan fatty acid ester, etc., a fatty acid ester-type surfactant such as a polyoxyethylene resin acid ester, a polyoxyethylene fatty acid diethyl, an ether-type surfactant such as a polyoxyethylene alkyl ether, a polyoxyethylene alkyl phenyl ether, a polyoxyethylene-polypropylene glycol, etc. may be mentioned, and from the viewpoint of further improvement in the shielding properties of the present coating film after the storage for a long period of time of the powder coating material, an ether-type surfactant is preferred.

Further, also from such a viewpoint that in the case of using a binder solution (as described later) prepared by adding a solvent (as described later) to the binder, the affinity to the solvent contained in the binder solution will be improved, and the storage stability of the binder solution will be good, the surfactant is preferably a nonionic surfactant, and an ether-type surfactant is particularly preferred.

The content (solid content) of the binder is preferably from 0.1 to 5 mass %, more preferably from 0.2 to 4.5 mass %, to the total mass (solid content) of the powder coating material. When the content of the binder is at least 0.1 mass %, bonding properties between the resin powder and the luster pigment will be more improved, it is possible to better suppress color unevenness of the obtainable coating film, and recovery and reuse of the powder coating material will be excellent. Further, when it is at most 5 mass %, blocking resistance will be more improved.

Further, in the binder, a resin component such as a terpene resin, an acrylic resin or a polyvinyl chloride resin may be contained to an extent not to lower the effects of the surfactant.

The powder coating material of the present invention may contain a component other than the above (hereinafter referred to also as "another additive"). In a case where such another additive is a powder of solid particles having a proper average particle size as a powder coating component, such a powder may be contained in the powder coating material. Such a solid component may also be contained in the resin particles. Another additive other than that may be contained in the resin particles or in the above-mentioned covering material or binder.

Another additive may, for example, be a curing agent, a curing catalyst, a plasticizer, a pigment other than a luster pigment, an ultraviolet absorber, a light stabilizer (a hindered amine light stabilizer, etc.), a matting agent (micronized synthetic silica), a leveling agent, a surface modifier, a degassing agent, a filler, a heat stabilizer, a thickener, a dispersing agent, an antistatic agent, a rust inhibitor, a silane coupling agent, an anti-fouling agent, a pollution-reducing treatment agent, etc.

A curing agent is to be contained in a powder coating material in which at least one of the fluororesin and the non-fluororesin has reactive groups, and it is a compound having at least two groups reactive with the reactive groups by heating. The reactive groups and the curing agent are reacted, so that at least one of the fluororesin and the non-fluororesin will be cross-linked or polymerized and cured.

The curing agent is preferably contained in the resin particles.

The curing agent is preferably an agent which is less reactive to the reactive groups at normal temperature rather than an agent reactive to the reactive groups at normal temperature. Specifically, when the reactive groups are hydroxy groups or carboxy groups, a curing agent having heat reactive groups is preferred rather than a curing agent having isocyanate groups.

The heat reactive groups are preferably blocked isocyanate groups. The blocked isocyanate groups are groups, from which blocking agents are to be detached to form isocyanate groups, when the powder coating material is heated and melted.

The curing agent is preferably a blocked isocyanate-type curing agent (a compound having at least two blocked isocyanate groups), an amine-type curing agent (a melamine resin, a guanamine resin, a sulfonamide resin, an urea resin, an aniline resin, etc.), a β-hydroxyalkyl amide-type curing agent, or a triglycidyl isocyanurate-type curing agent.

In a case where the fluororesin or the non-fluororesin has hydroxy groups as the reactive groups, the curing agent is preferably a blocked isocyanate-type curing agent from such a viewpoint that adhesion to a substrate, and the processability and water resistance of the present coating film will be more excellent.

In a case where the fluororesin or the non-fluororesin has carboxyl groups as the reactive groups, the curing agent is preferably a β-hydroxyalkylamide-type curing agent or a triglycidyl isocyanurate-type curing agent.

As the curing agent, one type may be used alone, or two or more types may be used in combination.

The blocked isocyanate-type curing agent is preferably solid at 25° C.

The blocked isocyanate-type curing agent is preferably a diisocyanate obtained by reacting a blocking agent with a polyisocyanate which is obtained by reacting an aliphatic or aromatic diisocyanate and a low-molecular compound having an active hydrogen.

Specific examples of the diisocyanate include tolylene diisocyanate, 4,4'-diphenylmethane diisocyanate, xylylene diisocyanate, hexamethylene diisocyanate, 4,4'-methylenebis(cyclohexyl isocyanate), methylcyclohexane diisocyanate, bis(isocyanatomethyl)cyclohexane isophorone diisocyanate, dimer acid diisocyanate, lysine diisocyanate, etc.

Specific examples of the low molecular compound having an active hydrogen include water, ethylene glycol, propylene glycol, trimethylolpropane, glycerin, sorbitol, ethylenediamine, ethanolamine, diethanolamine, hexamethylenediamine, isocyanurate, uretdione, a hydroxy group-containing low molecular weight polyester, polycaprolactone, etc.

Specific examples of the blocking agent include alcohols (methanol, ethanol, benzyl alcohol, etc.), phenols (phenol, cresol, etc.), lactams (caprolactam, butyrolactam, etc.), oximes (cyclohexanone, oxime, methyl ethyl ketoxime, etc.).

The softening temperature of the curing agent is preferably from 10 to 120° C., more preferably from 40 to 100° C. When the softening temperature is within the above range, the powder coating material is less likely to undergo curing at 25° C., and particulate blocks are less likely to be formed (i.e. it is possible to further improve the blocking resistance). Further, when the softening temperature is within the above range, during the production of the resin powder, the curing agent can easily be dispersed homogeneously in the resin powder, and the present coating film will be more excellent in the surface smoothness, strength and moisture resistance.

The content (solid content) of the curing agent is preferably from 5 to 40 mass %, more preferably from 10 to 30 mass %, to the total mass (solid content) of the powder coating material. When the content of the curing agent is within the above range, the effect of the curing agent tends to be more easily exhibited.

The curing catalyst is a catalyst to accelerate the curing reaction of the curing agent, and it is preferably contained in the resin particles. When the curing agent is a blocked isocyanate-type curing agent, the curing catalyst is preferably a tin catalyst (tin octylate, tributyltin laurate, dibutyltin dilaurate, etc.). The content (solid content) of the curing catalyst is preferably from 0.0001 to 0.01 part by mass, more preferably from 0.0005 to 0.005 part by mass, to 100 parts by mass of the content (solid content) of the curing agent.

As the curing catalyst, one type may be used alone, or two or more types may be used in combination.

A plasticizer is a component for reducing the melt viscosity of a resin, and it is preferably contained in the resin particles.

The plasticizer is preferably a vinyl ether-type compound, an ester-type compound, a polyol-type compound (such as glycerin) or a styrene-type compound (α-methylstyrene, etc.), and from the viewpoint of miscibility with the fluororesin, an ester-type compound is preferred, and a benzoic acid ester-type compound or a phthalic acid ester-type compound is particularly preferred.

Specific examples of the benzoic acid ester-type compound include diethylene glycol dibenzoate, dipropylene glycol dibenzoate, benzyl benzoate, 1,4-cyclohexane dimethanol dibenzoate, etc.

As the plasticizer, one type may be used alone, or two or more types may be used in combination.

The content (solid content) of the plasticizer is preferably from 0.1 to 20 mass %, particularly preferably from 0.5 to 10 mass %, to the total content (solid content) of the fluororesin and the non-fluororesin.

The average particle size of the powder coating material of the present invention is substantially the same as the average particle size of the resin powder, and is preferably from 5 to 100 µm. The lower limit value is more preferably 15 µm. And, the upper limit value is more preferably 60 µm, further preferably at most 50 µm.

The method for producing a powder coating material of the present invention is not particularly limited so long as it is a method whereby it is possible to obtain a powder coating material containing particles wherein luster pigment particles are bonded on the surface of particles constituting the resin powder, and the following method may be mentioned.

That is, the method for producing a powder coating material of the present invention is preferably a production method which comprises mixing a resin powder and a luster pigment to obtain a mixture, and then mixing a binder to the mixture to let the luster pigment particles be bonded to the particle surface of the resin powder via the binder.

The method of mixing the resin powder and the luster pigment is not particularly limited, and may be the same as the above-mentioned method of producing the resin powder.

As the binder to be mixed to the mixture, it is preferred to use a binder solution containing a binder, from such a viewpoint that bonding properties between the resin powder and the luster pigment will be thereby more excellent.

In the case of using a binder solution, after its addition, a solvent contained in the binder solution is distilled off, so as to completely evaporate the solvent and to dry the solid. By distilling the solvent off and drying the solid, it is possible not only to increase the bonding strength between the resin particles and the luster pigment particles contained in the solid, but also to further suppress blocking of the solid. Here, the evaporation and distilling off of the solvent are preferably carried out under vacuum suction.

The temperature for the evaporation and distilling off of the solvent is preferably from −5 to 50° C. When it is at most 50° C., blocking of the powder coating material can be suppressed.

Then, after the luster pigment particles are bonded to the resin particle surfaces, if necessary, classification treatment may be carried out to obtain a powder coating material having a desired particle size.

The solvent to be used in the binder solution may, for example, be an alkane such as pentane, hexane, heptane, octane, etc., an isoparaffin such as isopentane, isohexane, isoheptane, isooctane, etc., an alcohol such as methanol, ethanol, etc., or a halogen-containing solvent such as 1,1,1,3,3-pentafluorobutane, 1,1,1,2,2,3,4,5,5,5-decafluoropentane, 1,1,1,2,2,3,3,4,4,5,5,6,6-tridecafluorohexane, 1,1,2,2-tetrafluoro-1-(2,2,2-trifluoroethoxy)ethane, etc. The solvent is preferably a halogen-containing solvent from such a viewpoint that the solubility of the resin powder is low, and the solubility of the binder is good.

The content of the solvent in the binder solution is preferably from 0.5 to 99.5 mass %, particularly preferably from 1.0 to 99 mass %, to the total mass of the binder solution.

The coated article of the present invention comprises a substrate and a coating film formed on the substrate by the powder coating material of the present invention.

The coating film formed by the powder coating material of the present invention preferably has a three-layer structure wherein a layer of the non-fluororesin, a layer of the luster pigment and a layer of the fluororesin are laminated in this order, from such a viewpoint that it is thereby possible to suppress occurrence of color unevenness in the coated surface of the coated article, and the shielding properties, color tone and weather resistance will be more excellent.

The material of the substrate is not particularly limited, and may be inorganic material, organic material, organic-inorganic composite material, etc. The inorganic material may be concrete, natural stone, glass, metal (iron, stainless steel, aluminum, copper, brass, titanium, etc.), etc. The organic material may be plastic, rubber, adhesive, wood, etc. The organic-inorganic composite material may be fiber-reinforced plastic, resin-reinforced concrete, fiber-reinforced concrete, etc.

Among the above, a metal is preferred, and aluminum is particularly preferred. A substrate made of aluminum is excellent in corrosion resistance and light in weight and has an excellent performance in an application as a building material such as an exterior member.

The shape, size, etc. of the substrate are not particularly limited.

Examples of the substrate include exterior members for buildings such as composite panels, curtain wall panels, frames for curtain walls, window frames, etc., automotive members such as tire wheels (aluminum wheels), etc., construction equipment, frames of motorcycles, etc.

The water contact angle at the surface of the coating film is preferably from 1 to 55 degrees, particularly preferably from 3 to 50 degrees. When the water contact angle is at least the above lower limit value, the coating film is less likely to be eroded by an organic acid component derived from feces of birds or dead insects, and further, formation of mold on the coating film surface layer will be suppressed (the formation of mold is likely to lead to poor outer appearance). When the water contact angle is at most the above upper limit value, stain resistance will be excellent.

The water contact angle is measured, for example, by using "DM-051" (tradename) manufactured by Kyowa Interface Science Co., Ltd.

The thickness of the coating film is not particularly limited, but is preferably from 20 to 1,000 µm, more preferably from 20 to 500 µm, further preferably from 20 to 300 µm. In an application to e.g. a member for a high-rise building such as an aluminum curtain wall, the thickness is preferably from 20 to 90 µm. In an application where the demand for weather resistance is high, such as an outdoor unit of an air conditioner that is installed on the coast, a pole for a traffic signal, a sign, etc., the thickness is preferably from 100 to 200 µm.

The method for producing a coated article of the present invention is not particularly limited, and may be a method which comprises applying the powder coating material of the present invention to a substrate, to form a molten film made from a melt of the powder coating material, and then cooling the molten film to form a coating film.

The molten film made from a melt of the powder coating material may be formed at the same time as the application of the powder coating material to the substrate, or may be formed, after depositing the powder coating material to the substrate, by heating and melting the powder coating material on the substrate.

When the powder coating material contains a curing agent, there may be a case where substantially at the same time as the powder coating material is heated and melted, the curing reaction of reactive components in the composition begins, and in such a case, it is preferred to conduct the heat-melting of the powder coating material and the deposition to the substrate substantially at the same time, or to conduct the heat-melting of the powder coating material after the deposition of the powder coating material to the substrate.

The heating temperature (hereinafter referred to also as the "baking temperature") to heat and melt the powder coating material and to maintain its molten state for a predetermined time, and the heating retention time (hereinafter referred to also as the "baking time") are properly set depending upon the types and composition of raw material components for the powder coating material, the desired thickness of the coating film, etc.

In a case where the powder coating material does not contain a curing agent, the baking temperature is preferably from 160 to 300° C. In a case where the powder coating material contains a curing agent, the baking temperature is preferably set depending on the reaction temperature of the curing agent. For example, the baking temperature in the case of using a blocked isocyanate-type curing agent as the curing agent, is preferably from 120 to 240° C.

The reaction temperature of the curing agent may be obtained by measuring the change in elastic modulus of the powder coating material. The change in elastic modulus may be measured by using a rheometer such as Rheometer ARES, manufactured by TA Instruments.

The baking time is preferably from 2 to 60 minutes. In a case where the powder coating material does not contain a curing agent, it is more preferably from 5 to 60 minutes, particularly preferably from 10 to 50 minutes. In a case where the powder coating material contains a curing agent, it is more preferably from 2 to 50 minutes, particularly preferably from 5 to 40 minutes. When the baking time is at least the above lower limit value, the luster pigment will be well oriented at the liquid-liquid interface in the molten film. When the baking time is at most the above upper limit value, the reaction of the curing agent will proceed whereby adhesion will be good.

As the coating method, an electrostatic coating method, an electrostatic spraying method, an electrostatic dipping method, a misting method, a flow immersion method, a blowing method, a spraying method, a thermal spraying method, a plasma spraying method, etc. may be mentioned.

Even when the molten film is to be thinned, from the viewpoint of excellent surface smoothness of the molten film, and excellent shielding properties of the coating film, an electrostatic coating method using a powder coating gun is preferred.

The powder coating gun may be a corona charging-type coating gun, a triboelectrification-type coating gun, etc. The corona charging-type coating gun is a gun for spraying a powder coating material by corona discharge treatment. The triboelectrification-type coating gun is a gun for spraying a powder coating material by triboelectrification treatment.

The temperature for cooling of the molten film is preferably from 20 to 25° C. If the powder coating material of the present invention contains a curing agent, a cured film will be formed as a coating film. Cooling after baking may be either quenching or annealing, and from such a viewpoint that the coating film will be less likely to be peeled from the substrate, annealing is preferred.

EXAMPLES

In the following, the present invention will be described in detail with reference to Examples. However, the present invention is not limited to these Examples. Further, the blend amounts of the respective components in Tables as described later are based on mass.

[Materials Used]

The materials used in Examples and Comparative Examples will be shown below.

<Fluororesins>

(Fluororesin 1)

Into an autoclave (internal capacity: 250 mL, made of stainless steel), 51.2 g of cyclohexyl vinyl ether (CHVE), 13.3 g of 4-hydroxybutyl vinyl ether (HBVE), 55.8 g of xylene, 15.7 g of ethanol, 1.1 g of potassium carbonate, 0.7 g of a 50 mass % xylene solution of tert-butyl peroxypivalate (hereinafter referred to as a polymerization initiator), and 63.0 g of chlorotrifluoroethylene (CTFE) were introduced. Then, the temperature was gradually raised, and after reaching 55° C., kept for 20 hours. Thereafter, the temperature was raised to 65° C. and kept for 5 hours. Thereafter, it was cooled, followed by filtration to remove the residue and to obtain a filtrate containing a fluororesin 1.

This filtrate was vacuum-dried at 65° C. for 24 hours to remove the solvent, and further vacuum-dried at 130° C. for 20 minutes, to obtain a blocky fluororesin 1, which was pulverized to obtain a powdery fluororesin 1.

The fluororesin 1 contained units based on CTFE, units based on CHVE and units based on HBVE in amounts of 50 mol %, 35 mol % and 15 mol %, respectively. The fluororesin 1 had a SP value of 18.4 $(J/cm^3)^{1/2}$, Mn of 12,000 and a fluorine content of 25 mass %.

(Fluororesin 2)

Into an autoclave (internal capacity: 250 mL, made of stainless steel), 10.4 g of tert-butyl vinyl ether (t-BuVE), 13.2 g of HBVE, 38.5 g vinyl pivalate (VPV), 55.0 g of xylene, 15.7 g of ethanol, 1.1 g of potassium carbonate, 0.7 g of the polymerization initiator and 63.0 g of CTFE were introduced. Then, the temperature was gradually raised, and after reaching 55° C., kept for 20 hours. Thereafter, the temperature was raised to 65° C. and kept for 5 hours. Thereafter, it was cooled, followed by filtration to remove the residue and to obtain a filtrate containing a fluororesin 2.

This filtrate was vacuum-dried at 65° C. for 24 hours to remove the solvent and further vacuum-dried at 130° C. for 20 minutes to obtain a blocky fluororesin 2, which was pulverized to obtain a powdery fluororesin 2.

The fluororesin 2 contained units based on CTFE, units based on t-BuVE, units based on HBVE and units based on VPV in amounts of 50 mol %, 11 mol %, 4 mol % and 35 mol %, respectively. The fluororesin 2 had a SP value of 17.8 $(J/cm^3)^{1/2}$, Mn of 12,000 and a fluorine content of 25 mass %.

<Non-Fluororesins>

Polyester resin 1: Product name "CRYLCOAT (registered trademark) 4890-0" (manufactured by Daicel-Allnex Ltd. Co., Ltd.). Polyester resin 1 had Mn of 2,500 and a SP value of 22.8 $(J/cm^3)^{1/2}$.

Polyester resin 2: Product name "U-PICA COAT (registered trademark) GV-740" (manufactured by Japan U-pica Company Ltd.). Polyester resin 2 had Mn of 3,700 and a SP value of 28.8 $(J/cm^3)^{1/2}$.

<Luster Pigments>

Luster pigment 1: Product name "PCF7620A" (manufactured by Toyo Aluminium K.K.). Powder consisting of aluminum particles with their surface covered with an acrylic resin (SP value: 21.8 $(J/cm^3)^{1/2}$) as a covering material.

Luster pigment 2: Product name "PCR901" (manufactured by ECKART Co., Ltd.). Powder consisting of aluminum particles with their surface covered with silica and an aliphatic amine (SP value: 19.2 $(J/cm^3)^{1/2}$) as covering materials.

Luster pigment 3: Product name "0100M" (manufactured by Toyo Aluminium K.K.). Powder consisting of aluminum particles with their surface covered with stearic acid (SP value: 18.2 $(J/cm^3)^{1/2}$) as a covering material.

<Binders>

Surfactant 1: Cationic surfactant (manufactured by NOF Corporation, product name "Nissan cation MA", melting point: 60° C.)

Surfactant 2: Nonionic surfactant (manufactured by Sanyo Chemical Industries, Ltd. product name "NAROACTY CL-400", polyoxyethylene alkyl ether, melting point: 52° C.)

Surfactant 3: Nonionic surfactant (manufactured by Nippon Nyukazai Co., Ltd., product name "NEWCOL 2320", polyoxyethylene alkyl ether, melting point: 30° C.)

Surfactant 4: Anionic surfactant (manufactured by NOF Corporation, product name "DIAPON K", melting point: 30° C.)

Surfactant 5: Anionic surfactant (manufactured by Miyoshi oil & fat Co., Ltd., product name "Supamin 5", melting point: 0° C.) Hydrogenated terpene resin: Manufactured by Yasuhara Chemical Co., Ltd., product name "YS Polyester TH-130"

<Solvents>

Solvent 1: 1,1,2,2-tetrafluoro-1-(2,2,2-trifluoroethoxy)ethane (boiling point: 56° C.)

Solvent 2: 1,1,1,2,2,3,3,4,4,5,5,6,6-tridecafluorohexane (boiling point: 71° C.)

<Curing Agent>

Curing agent 1: Product name "VESTAGON (registered trademark) B-1530" (manufactured by Evonik Industries), reaction temperature: 160° C., blocked isocyanate curing agent <Curing Catalyst>

Curing catalyst 1: Xylene solution of dibutyltin dilaurate (10,000-fold diluted product)

<Plasticizer>

Plasticizer 1: tradename "Benzoflex 352" (1,4-cyclohexanedimethanol dibenzoate, molecular weight: 352, melting point: 118° C., manufactured by Eastman Chemical Company)

<Other Additives>

Degassing agent: benzoin

Surface modifier A: tradename "BYK-360P" (manufactured by BYK Chemie GmbH)

Surface modifier B: tradename "CERAFLOUR 960" (micronized modified amide wax, melting point: 145° C., manufactured by BYK-Chemie GmbH)

<Production of Binder Solutions>

The respective components were mixed in mixing ratios as shown in Table 1, to obtain binder solutions 1 to 6.

TABLE 1

| Table 1 | | | Binder solution | | | | | |
|---|---|---|---|---|---|---|---|---|
| | | | 1 | 2 | 3 | 4 | 5 | 6 |
| Binder | Surfactant | 1 | 5.0 | — | — | — | — | — |
| | | 2 | — | 5.0 | — | — | — | — |
| | | 3 | — | — | 5.0 | — | — | — |
| | | 4 | — | — | — | 5.0 | — | — |
| | | 5 | — | — | — | — | 5.0 | — |
| | Hydrogenated terpene resin | | — | — | — | — | — | 0.8 |
| | Solvent | 1 | 47.5 | 47.5 | 47.5 | 47.5 | 47.5 | — |
| | | 2 | 47.5 | 47.5 | 47.5 | 47.5 | 47.5 | 99.2 |

<Production of Resin Powders>

The respective components were mixed in the blend ratios as shown in Table 2, to obtain resin powders 1 to 4. Specifically, the fluororesin 1, the non-fluororesin 2, the curing agent, the curing catalyst, the plasticizer and various additives were put into a high speed mixer and mixed for 1 minute to obtain a mixture for a resin powder.

The obtained mixture for a resin powder was melt-kneaded by a twin-screw extruder adjusted to a temperature of 120° C., and the kneaded product obtained by the melt-kneading, was cold-rolled by a cooling roll, and the obtained plate-form kneaded product was pulverized by a pin mill pulverizer. Thereafter, the pulverized product obtained by the pulverization was classified by a net with 100 μm mesh opening, to obtain resin powders 1 to 4.

In the production of the resin powder 4, non-fluorinated resin 2 was not used.

TABLE 2

| Table 2 | | | Resin powder | | | |
|---|---|---|---|---|---|---|
| | | | 1 | 2 | 3 | 4 |
| Fluororesin | | 1 | 20.8 | — | 48.4 | 69.2 |
| | | 2 | — | 20.8 | — | — |
| Non-fluororesin | | 1 | 48.4 | 48.4 | — | — |
| | | 2 | — | — | 20.8 | — |
| Curing agent | | 1 | 22.2 | 22.2 | 22.2 | 22.2 |
| Curing catalyst | | 1 | 0.001 | 0.001 | 0.001 | 0.001 |
| Plasticizer | | 1 | 3.5 | 3.5 | 3.5 | 3.5 |
| Other additives | Degassing agent | | 0.7 | 0.7 | 0.7 | 0.7 |
| | Surface modifier A | | 1.5 | 1.5 | 1.5 | 1.5 |
| | Surface modifier B | | 3.0 | 3.0 | 3.0 | 3.0 |

<Production of Powder Coating Materials>

So that the blend ratios would be as shown in Table 3, the luster pigment was added to the resin powder obtained as described above and mixed by a scoopula to obtain a uniform mixture.

Then, the binder solution obtained as described above was added thereto, followed by naturally drying for 1 hour while kneading. This was charged into a 1 liter volumetric flask, and using an evaporator, vacuum-dried at ordinary temperature for 20 minutes while mixing at 30 rpm. A powder thus obtained was classified by a net with 100 μm mesh opening, to obtain the powder coating material in each of Examples and Comparative Examples. Each powder coating material thus obtained was a powdery product susceptible to dusting.

Further, the surface state of the resin powder in the powder coating material in each Example was observed by a scanning electron microscope (product name "Ultra High Resolution Analytical Scanning Electron Microscope SU-70", manufactured by Hitachi High-Technologies Corporation). As a result, with respect to the powder coating material in each Example, it was confirmed that the luster pigment was bonded to the surface of resin particles constituting the resin powder.

x (bad): The whole is a large lump. It is difficult to disintegrate it by hand.
<Color Tone (Luster) of Coating Film>
The state of the coating film surface of each test specimen was visually observed and evaluated according to the following standards.

TABLE 3

| Table 3 | | | SP value | | Ex. 1 | Ex. 2 | Ex. 3 | Ex. 4 | Ex. 5 | Ex. 6 | Ex. 7 | Comp. Ex. 1 | Comp. Ex. 2 | Comp. Ex. 3 | Comp. Ex. 4 |
|---|---|---|---|---|---|---|---|---|---|---|---|---|---|---|---|
| Powder coating material blend (parts by mass) | Binder solution | 1 | — | | 4.7 | — | — | — | — | — | 4.7 | — | — | 4.7 | — |
| | | 2 | — | | — | 4.7 | — | — | 4.7 | 4.7 | — | — | — | — | — |
| | | 3 | — | | — | — | 4.7 | — | — | — | — | — | — | — | — |
| | | 4 | — | | — | — | — | 4.7 | — | — | — | — | — | — | — |
| | | 5 | — | | — | — | — | — | — | — | — | 4.7 | — | — | — |
| | | 6 | — | | — | — | — | — | — | — | — | — | — | — | 4.7 |
| | Resin powder | 1 | 18.4 (Fluororesin) | 22.8 (Non-fluororesin) | 92.5 | 92.5 | 92.5 | 92.5 | — | — | — | 92.5 | 97.0 | — | — |
| | | 2 | 18.4 (Fluororesin) | 22.8 (Non-fluororesin) | — | — | — | — | — | 92.5 | — | — | — | — | — |
| | | 3 | 18.4 (Fluororesin) | 22.8 (Non-fluororesin) | — | — | — | — | 92.5 | — | 92.5 | — | — | — | — |
| | | 4 | 18.4 (Fluororesin) | — | — | — | — | — | — | — | — | — | — | 92.5 | 92.5 |
| | Luster pigment | 1 | 21.8 | | 2.8 | 2.8 | 2.8 | 2.8 | — | — | — | 2.8 | 3.0 | 2.8 | 2.8 |
| | | 2 | 19.2 | | — | — | — | — | 2.8 | — | — | — | — | — | — |
| | | 3 | 18.2 | | — | — | — | — | — | 2.8 | 2.8 | — | — | — | — |
| Evaluation results | Blocking resistance | | | | ◎ | ◎ | ○ | ○ | ◎ | ◎ | ◎ | x | ◎ | ◎ | ◎ |
| | Color tone | | | | ○ | ○ | ○ | ○ | ○ | ○ | ○ | ○ | ○ | ○ | x |
| | Hydrochloric acid resistance | | | | ○ | ○ | ○ | ○ | ○ | ○ | ○ | ○ | ○ | x | x |
| | Nitric acid resistance | | | | ○ | ○ | ○ | ○ | ○ | ○ | ○ | ○ | ○ | x | x |
| | Shielding property 1 (%) | | | | 92 | 90 | 91 | 83 | 87 | 81 | 81 | 93 | 90 | 78 | 66 |
| | Shielding property 2 (%) | | | | 80 | 90 | 90 | 75 | — | — | — | — | — | — | — |
| | Accelerated weather resistance test (gloss retention %) | | | | 81 | 83 | 84 | 88 | 84 | 82 | 72 | 85 | 81 | 63 | 59 |
| | Accelerated weather resistance test (color difference ΔE value) | | | | 1.9 | 2.6 | 2.9 | 2.1 | 2.8 | 2.5 | 2.5 | 2.9 | 1.9 | 2.5 | 6.1 |
| | Adhesion | | | | ○ | ○ | ○ | ○ | ○ | ○ | ○ | ○ | ○ | ○ | ○ |
| | Color unevenness | | | | ○ | ○ | ○ | ○ | ○ | ○ | ○ | ○ | x | ○ | ○ |
| | Recovery and reuse properties | | | | 1.8 | 0.6 | 2.1 | 1.1 | 2.5 | 2.7 | 2.3 | 2.5 | 5.2 | 2.2 | 2.8 |
| | | | | | ○ | ○ | ○ | ○ | ○ | ○ | ○ | ○ | x | ○ | ○ |

[Evaluation Tests]

With respect to each powder coating material, the following evaluation tests were carried out. The results of the respective evaluation tests are also shown in the above Table 3. Among the following evaluation tests, in evaluation tests except for evaluation of the blocking resistance, shielding properties and recovery and reuse properties, the evaluation tests were conducted by using a test specimen prepared as follows.

Using each powder coating material, electrostatic coating was conducted on one surface of an aluminum plate (substrate) subjected to chromate treatment, by means of an electrostatic coating machine equipped with a powder coating gun (manufactured by Onoda Cement Co., Ltd., tradename: GX3600C), followed by being held in a 200° C. atmosphere for 20 minutes, and then being left to cool to room temperature, to obtain an aluminum plate provided with a coating film (cured film) having a thickness of from 55 to 65 μm (test specimen).

<Blocking Resistance>

50 g of each powder coating material was stored for 24 hours under a condition of 30° C. Then, the blocking state of each powder coating material was evaluated according to the following standards.

◎ (very good): Almost no change is observed in the state of powder coating before storage.

○ (good): Small soft lumps are formed. The lumps are easily disintegrated by hand.

○ (good): High metallic hue.

x (bad): Low metallic hue.

<Hydrochloric Acid Resistance, Nitric Acid Resistance>

A 10% hydrochloric acid aqueous solution was prepared by ion-exchanged water and hydrochloric acid as special grade chemical. Further, a 10% nitric acid aqueous solution was prepared by ion-exchanged water and nitric acid as special grade chemical.

Then, the above hydrochloric acid aqueous solution and nitric acid aqueous solution were, respectively, dropped by 5 mL on the coating film of the test specimen, then covered and held for 4 hours, and then washed with water. Thereafter, the spot traces on the coating film were visually observed, and the hydrochloric acid resistance and nitric acid resistance were evaluated based on the following standards.

○ (good): No change is observed in the coating film.

x (bad): Whitening or blistering is remarkable.

<Shielding Property 1>

Each powder coating material was applied on a white•black monochrome steel panel for testing the shielding power (manufactured by METOPAC PANELS Co.) by the same procedure as in the preparation of a test specimen as described above, and the L value (lightness) on the white plate and the L value on the black plate were measured. From the results, the shielding rate (%) was calculated by the formula of (L value on the black plate/L value on the white plate)×100. For the color measurement, a spectral colorimeter SC-T (product name) manufactured by Suga Test Instruments Co., Ltd. was used. Here, the higher the shielding rate, the better the shielding property. The evaluation of the shielding property 1 was conducted after the preparation of each powder coating material.

<Shielding Property 2>

In the same manner as in the above evaluation method for the shielding property 1 except for using each powder coating material stored for 30 days under conditions of 25° C. and a RH of 50%, evaluation of the shielding property of a coating film formed by using the powder coating material stored for a long period of time (the shielding property after a long term storage) was conducted.

<Accelerated Weather Resistance (Gloss Retention and Color Difference ΔE)>

With respect to each test specimen, an accelerated weather resistance test was conducted by using an accelerated weather resistance tester in accordance with JIS B7753: 2007 (sunshine weatherometer system) by setting the test time to be 3,000 hours. By setting the 60° specular gloss value of the coating film before the test to be 100%, the retention of the 60° specular gloss value of the coating film after the test (the gloss retention) (%) was obtained. The 60° specular gloss value was measured by a gloss meter (product name "micro-TRI-gross", manufactured by BYK Co., Ltd., incident/reflection angle: 60°). Further, the color difference ΔE between before and after the test was measured by a color difference meter (manufactured by Minolta: CR-300).

The higher the gloss retention and the closer the value of color difference ΔE to 0, the better the weather resistance.

<Adhesion>

The coating film of each test specimen was cross-cut with a 1 mm spacing into 100 squares, and an adhesive tape was bonded thereon, and thereafter, the adhesive tape was peeled, whereby the adhesion of the coating film was evaluated by the following standards from the number of squares that were not peeled by the adhesive tape, among the 100 squares.

○ (good): The number of squares that were not peeled is at least 90.

x (bad): The number of squares that were not peeled is 89 or less.

<Color Unevenness>

With respect to each test specimen, color unevenness of the coating film was visually evaluated by the following standards.

○ (good): Occurrence of color unevenness is less than 20% of the entire area of the test specimen.

x (bad): Occurrence of color unevenness exceeds 20% of the entire area of the test specimen.

<Recovery and Reuse Properties>

The powder coating material which did not adhere to the surface of each test specimen was recovered and reused, and the hue difference (ΔE value) between the obtained coating film and the original coating film was measured by using spectrocolorimeter CM-512 (manufactured by Konica Minolta, Inc.). Based on the obtained ΔE value, the recovery and reuse properties of the powder coating material were evaluated by the following standards.

○ (good): ΔE value is at most 3.

x (bad): ΔE value exceeds 3.

<Evaluation Results>

As shown in Table 3, it has been found that according to the powder coating materials in Examples, it is possible to form coating films excellent in the color tone and weather resistance and having color unevenness suppressed, and the powder coating materials are also excellent in blocking resistance. Further, it has been found that according to the powder coating materials in Examples, it is possible to form coating films excellent in hydrochloric acid resistance, nitric acid resistance, shielding properties, and adhesion, and the powder coating materials are also excellent in recovery and reuse properties.

Furthermore, from the comparison of Examples 1 to 4, when the melting point of the surfactant contained in the binder was at least 40° C. (Examples 1 and 2), the powder coating materials were superior in blocking resistance.

From the comparison of Examples 1 to 4, when the surfactant contained in the binder was a nonionic surfactant (Examples 2 and 3), the shielding properties after the long-term storage were excellent.

From the comparison of Examples 1 to 7, when the SP values of the respective components contained in the powder coating materials satisfied the aforementioned relations (Examples 1 to 6), the obtainable coating films were better in the gloss retention.

On the other hand, the powder coating material in Comparative Example 1 using a surfactant having a melting point of less than 25° C., had blocking resistance lowered.

The coating film obtained from the powder coating material in Comparative Example 2 prepared by a dry blending method without using a binder has been shown to have color unevenness remarkably. Further, the recovery and reuse properties of the powder coating material also tended to deteriorate.

The coating film obtained from the powder coating material in Comparative Example 3 using a resin powder containing no non-fluororesin has been shown to have poor gloss retention and poor weather resistance. Further, the hydrochloric acid resistance, nitric acid resistance and shielding properties of the coating film also tended to deteriorate.

The coating film obtained from the powder coating material in Comparative Example 4 obtained by using the hydrogenated terpene resin in place of a surfactant as a binder, was poor in weather resistance and color tone. Further, the hydrochloric acid resistance, nitric acid resistance and shielding properties of the coating film also tended to deteriorate.

This application is a continuation of PCT Application No. PCT/JP2016/088210, filed on Dec. 21, 2016, which is based upon and claims the benefit of priority from Japanese Patent Application No. 2015-255174 filed on Dec. 25, 2015. The contents of those applications are incorporated herein by reference in their entireties.

What is claimed is:

1. A powder coating material comprising a resin powder, a luster pigment and a binder, wherein
   the resin powder contains a fluororesin and a non-fluororesin,
   the binder contains a surfactant having a melting point of at least 25° C., and
   the luster pigment is bonded to a particle surface of the resin powder via the binder.

2. The powder coating material according to claim 1, wherein the resin powder is composed of particles of a mixed resin containing the fluororesin and the non-fluororesin.

3. The powder coating material according to claim 1, wherein the surfactant is a nonionic surfactant.

4. The powder coating material according to claim 3, wherein the nonionic surfactant is an ether type surfactant.

5. The powder coating material according to claim 1, wherein the melting point of the surfactant is at least 40° C.

6. The powder coating material according to claim 1, wherein the mass ratio of the content of the fluororesin to the content of the non-fluororesin is from 0.25 to 4.

7. The powder coating material according to claim 1, wherein the value obtained by subtracting the SP value of the fluororesin from the SP value of the non-fluororesin is at least 0.4 $(J/cm^3)^{1/2}$.

8. The powder coating material according to claim 1, wherein the luster pigment consists of luster pigment particles covered by a covering material, and the SP value of the covering material is larger than the SP value of the fluororesin and smaller than the SP value of the non-fluororesin.

9. The powder coating material according to claim 1, wherein the content (solid content) of the luster pigment is from 0.7 to 23 mass % to the total mass (solid content) of the powder coating material.

10. A coated article comprising a substrate and a coating film formed on the substrate by the powder coating material as defined in claim 1.

11. A method for producing the powder coating material according to claim 1, the method comprising:
    mixing the resin powder and the luster pigment to obtain a mixture, and
    mixing the mixture and the binder, to let the luster pigment be bonded to the particle surface of the resin powder via the binder.

12. The method according to claim 11, wherein as the binder, a binder solution containing a solvent is used, and after mixing the binder solution and the mixture, the solvent is removed to let the luster pigment particles be bonded to the particle surface of the resin powder.

* * * * *